United States Patent
Song et al.

(10) Patent No.: US 12,194,687 B2
(45) Date of Patent: Jan. 14, 2025

(54) METHOD FOR FORMING MULTI-MATERIAL MECHANICAL FUNCTIONAL MEMBER IN ADDITIVE MANUFACTURING AND PRODUCT

(71) Applicant: HUAZHONG UNIVERSITY OF SCIENCE AND TECHNOLOGY, Hubei (CN)

(72) Inventors: Bo Song, Hubei (CN); Zhi Zhang, Hubei (CN); Lei Zhang, Hubei (CN); Yusheng Shi, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 406 days.

(21) Appl. No.: 17/777,284

(22) PCT Filed: Apr. 30, 2021

(86) PCT No.: PCT/CN2021/091275
§ 371 (c)(1),
(2) Date: May 17, 2022

(87) PCT Pub. No.: WO2022/057271
PCT Pub. Date: Mar. 24, 2022

(65) Prior Publication Data
US 2022/0396035 A1   Dec. 15, 2022

(30) Foreign Application Priority Data

Sep. 17, 2020   (CN) .......................... 202010977123.6

(51) Int. Cl.
*B29C 64/393*   (2017.01)
*B29C 64/336*   (2017.01)
(Continued)

(52) U.S. Cl.
CPC .......... *B29C 64/393* (2017.08); *B29C 64/336* (2017.08); *B33Y 50/02* (2014.12);
(Continued)

(58) Field of Classification Search
None
See application file for complete search history.

(56) References Cited

U.S. PATENT DOCUMENTS

2012/0285114 A1   11/2012   Queheillalt et al.

FOREIGN PATENT DOCUMENTS

CN   105033188   11/2015
CN   105 205 213 A   *   12/2015
(Continued)

OTHER PUBLICATIONS

"International Search Report (Form PCT/ISA/210) of PCT/CN2021/091275", mailed on Jul. 29, 2021, with English translation thereof, pp. 1-5.
(Continued)

*Primary Examiner* — Mohammad M Ameen
(74) *Attorney, Agent, or Firm* — JCIPRNET

(57) ABSTRACT

A method for forming a multi-material mechanical functional member in additive manufacturing. The method includes the following steps: S1: dividing an object to be formed into a plurality of portions, analyzing and measuring mechanical properties of each portion, and constructing a unit cell library; S2: forming a lattice structure by using a unit cell structure in the unit cell library to obtain the lattice structure corresponding to each portion; S3: selecting a raw material of the lattice structure, measuring and comparing mechanical properties of each lattice structure with the mechanical properties of each portion of the object to be formed, where when the mechanical properties of each portion are satisfied, the lattice structure is the required
(Continued)

lattice structure, otherwise, step S2 is repeated; and S4: forming a three-dimensional model by a method of additive manufacturing to accordingly obtain the required object to be formed.

7 Claims, 5 Drawing Sheets

(51) Int. Cl.
*B33Y 50/02* (2015.01)
*B29L 31/00* (2006.01)
*B33Y 10/00* (2015.01)
*B33Y 80/00* (2015.01)

(52) U.S. Cl.
CPC ......... *B29L 2031/772* (2013.01); *B33Y 10/00* (2014.12); *B33Y 80/00* (2014.12)

(56) References Cited

FOREIGN PATENT DOCUMENTS

| | | |
|---|---|---|
| CN | 105205213 | 12/2015 |
| CN | 108897935 | 11/2018 |
| CN | 109531992 | 3/2019 |
| CN | 110 610 040 A * | 12/2019 |
| CN | 112163291 | 1/2021 |

OTHER PUBLICATIONS

"Written Opinion of the International Searching Authority (Form PCT/ISA/237) of PCT/CN2021/091275", mailed on Jul. 28, 2021, pp. 1-4.

* cited by examiner

METHOD FOR FORMING MULTI-MATERIAL MECHANICAL FUNCTIONAL MEMBER IN ADDITIVE MANUFACTURING AND PRODUCT

CROSS-REFERENCE TO RELATED APPLICATION

This application is a 371 of international application of PCT application serial no. PCT/CN2021/091275, filed on Apr. 30, 2021, which claims the priority benefit of China application no. 202010977123.6, filed on Sep. 17, 2020. The entirety of each of the above mentioned patent applications is hereby incorporated by reference herein and made a part of this specification.

TECHNICAL FIELD

The disclosure relates to the technical field of additive manufacturing, and in particular, relates to a method for forming a multi-material mechanical functional member in additive manufacturing and a product.

DESCRIPTION OF RELATED ART

With the continuous progress of mechanical engineering, the types of functional members continue to grow, but the requirements for materials are also increasing. Multi-material mechanical functional members are widely used because the mechanical properties of different portions may be changed by changing material types and combinations. However, based on the adhesion of different materials on the microstructures of the multi-material mechanical functional members, stress concentration may be easily generated, and manufacturing costs may increase.

A lattice structure has mechanical properties such as high specific strength. Controllable mechanical properties may be achieved by controlling the lattice unit cell type, size, and periodic arrangement. Further, in recent years, with the rapid development of additive manufacturing technology, lattice structures with high precision and good surface quality may be prepared. Therefore, through additive manufacturing, a single material may be used to prepare a variety of lattice structures with different mechanical properties to be combined to replace multi-material mechanical functional members. Further, since there is no internal bonding of dissimilar materials, the smooth transition of mechanical properties is ensured, stress concentration is avoided, costs are reduced, and lightweight is achieved.

SUMMARY

In view of the above defects or improvement needs found in the related art, the disclosure provides a method for forming a multi-material mechanical functional member in additive manufacturing and a product in which a unit cell structure is selected and a lattice structure for each portion is then formed by using the unit cell structure. Compared with a solid structure of a part to be formed, the lattice structure on the one hand satisfies mechanical properties of the product, and a structure of the lattice structure on the other hand is equivalent to a solid structure and is lighter in weight, so quality of the original part is greatly reduced, and utilization of the material is improved.

To realize the above purpose, according to one aspect of the disclosure, a method for forming a multi-material mechanical functional member in additive manufacturing is provided, and the method includes the following steps.

In S1, an object to be formed including a plurality of types of materials is divided into a plurality of portions according to the different types of materials, mechanical properties of each portion are analyzed and measured, and a database including a plurality of unit cell structures, that is, a unit cell library, is constructed.

In S2, one unit cell structure is selected from the unit cell library for each portion of the object to be formed, and a lattice structure is formed by using the unit cell structure to obtain the lattice structure corresponding to each portion of the object to be formed.

In S3, a raw material of the lattice structure is selected, mechanical properties of each lattice structure are measured and compared with the mechanical properties of each portion of the object to be formed in step S1. When the mechanical properties of the lattice structure corresponding to each portion are not less than the mechanical properties of each portion of the object to be formed in step S1, the lattice structure is the required lattice structure, otherwise, step S2 is repeated.

In S4, the lattice structures corresponding to the portions obtained in step S3 are assembled into a three-dimensional model of the object to be formed. The three-dimensional model is formed by a method of additive manufacturing to accordingly obtain the required object to be formed.

Preferably, a method of measuring the mechanical properties of each portion in step S1 is implemented through experimental measurement or finite element simulation.

Preferably, mechanical parameters of the unit cell structures in the unit cell library are known in step S1, and the mechanical parameters include Young's modulus, bulk modulus, and shear modulus.

Preferably, each unit cell structure in the unit cell library is preferably a simple cube, a face-centered cube, a body-centered cube, a regular octahedron, an octet truss, or a triply periodic minimal surface in step S1.

Preferably, the raw material in step S3 of selecting the raw material of the lattice structure is a material, that is, the raw materials of the lattice structures corresponding to the portions are the same and all are the selected materials.

Preferably, the step of assembling the lattice structures into the three-dimensional model of the object to be formed in step S4 further includes the following step. Connection structures are set at connection interfaces of different portions, such that the three-dimensional model obtained after assembly meets mechanical property requirements of the overall object to be formed.

Preferably, the method of additive manufacturing is selected according to the selected raw material in step S4, laser selective sintering or a laser sintering technology is selected for a metal material, fused deposition modeling is used for engineering plastics, and photocuring molding is selected for a photosensitive material.

According to another aspect of the disclosure, a product obtained through the foregoing method is provided.

In general, the above technical solutions provided by the disclosure provide the following beneficial effects compared with the related art.

1. In the disclosure, a unit cell structure is selected and a lattice structure for each portion is then formed by using the unit cell structure. Compared with the solid structure of a part to be formed, the lattice structure on the one hand satisfies the mechanical properties of the product, and the structure of the lattice structure on the other hand is equivalent to a solid structure and is lighter in weight, so quality of the original part is greatly reduced, and utilization of the material is improved.

2. In the disclosure, the part is divided into a plurality of portions according to the materials of the part, and each portion is prepared as a different lattice structure. During the forming process, the presence of dissimilar materials inside the different portions is avoided, and bonding and stress concentration of dissimilar materials in the different portions are also avoided.

3. In the disclosure, the part to be formed is formed by selecting 3D printing. This is because the 3D printing process is formed according to slices, and the different portions of each layer may be formed at the same time, rather than by partitions. Therefore, the final product obtained has good overall performance, connection defects at the junctions among different portions are avoided, and high precision is generated. Favorable surface quality of the obtained material mechanical functional member is therefore provided.

4. The materials of all lattice structures selected in the method of the disclosure are the same. That is, the original multi-material part to be formed is printed with one material, and a single-material mechanical functional member prepared by additive manufacturing replaces the conventional multi-material mechanical functional member. Each portion of the single-material mechanical functional member is formed by periodic superposition of multiple lattice unit cells, so that different portions of the member have different mechanical properties. According to the mechanical properties of the multi-material mechanical functional member, the lattice unit cells are designed for the corresponding position of the single-material mechanical functional member, and the lattice structures are formed by periodic arrangement. As such, the mechanical properties possessed by multi-material mechanical functional member are achieved. Compared with the multi-material mechanical functional member, the single-material mechanical functional member is simple to manufacture and requires lower costs. Microscopically, there is no dissimilar material bonding, and the mechanical properties transition smoothly, stress concentration in the internal connection portions is avoided when the multi-material mechanical functional member bear an external force. By using the additive manufacturing technology to replace the conventional processing methods, a single-material mechanical functional member featuring a complex shape and precise internal structure may be prepared.

BRIEF DESCRIPTION OF THE DRAWINGS

FIG. 3A is a schematic diagram of connection, and FIG. 3B is a modified connection plane view of the regular octahedral lattice structure connected to the simple cubic structure.

DESCRIPTION OF THE EMBODIMENTS

In order to make the objectives, technical solutions, and advantages of the disclosure clearer and more comprehensible, the disclosure is further described in detail with reference to the drawings and embodiments. It should be understood that the specific embodiments described herein serve to explain the disclosure merely and are not used to limit the disclosure. In addition, the technical features involved in the various embodiments of the disclosure described below can be combined with each other as long as the technical features do not conflict with each other.

Figure 1:
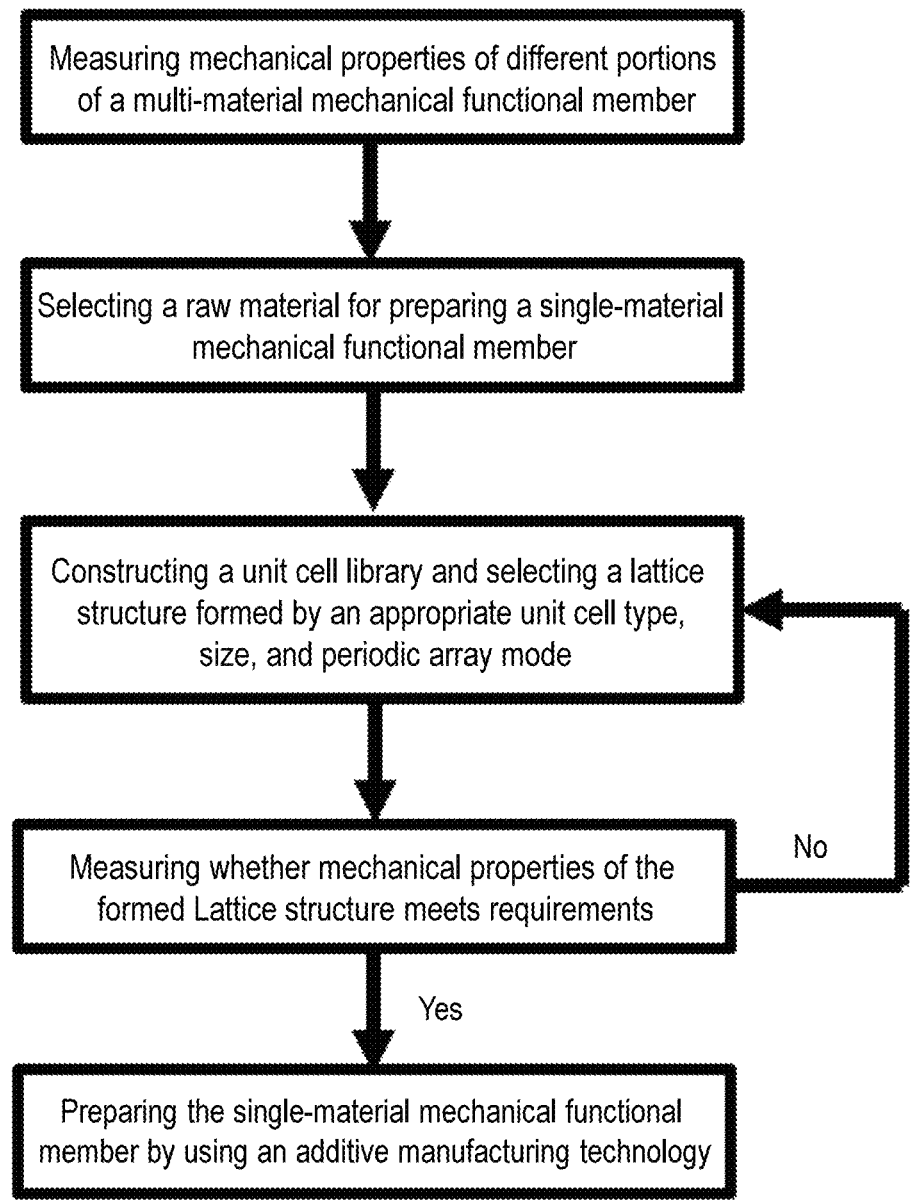
FIG. 1 is a flow chart of a method for forming a multi-material mechanical functional member in additive manufacturing according to a preferred embodiment of the disclosure.

As shown in FIG. 1, a method for forming a multi-material mechanical functional member in additive manufacturing is provided, and the method includes the following steps. Mechanical properties of different portions of a multi-material mechanical functional member are measured. A raw material for preparing a single-material mechanical functional member is selected. A unit cell library is constructed, and a lattice structure formed by an appropriate unit cell type, size, and periodic array mode are selected. Mechanical properties of the formed lattice structure are measured, and if requirements are not satisfied, selection of the unit cell type, size, and periodic array mode of the lattice structure executed in the previous step is repeated. If the requirements are satisfied, the single-material mechanical functional member is are prepared by an additive manufacturing technology.

Further, mechanical properties of various portions of the multi-material mechanical functional member is performed, and such measurement of the mechanical properties is performed through experiments or finite element simulation (FEM).

Different portions of the multi-material mechanical functional member have varying mechanical properties, and the portions with the same mechanical properties are treated as an entity. Therefore, the multi-material mechanical functional member has a (a=1, 2, 3, 4, . . . , and n) entities of different mechanical properties. The mechanical properties of the a entities which are obtained by dividing the multi-material mechanical functional member are calculated directly by experimental measurement or CAD modeling and then are imported into FEM software.

Further, the raw material for preparing the single-material mechanical functional member is selected, and such selection includes reasonable selection which is made according to the mechanical properties possessed by each portion of the multi-material functional member, costs of the raw material, and an application scenario of the functional member.

Since mechanical properties of a lattice unit cell prepared based on a single material are less than those of a solid material, a range of tunable mechanical properties of a lattice structure prepared based on a single material is less than that of a solid single material. Therefore, the corresponding mechanical properties of a selected single material need to be greater than those of any one of the a entities obtained by dividing the multi-material mechanical functional member. If more than 1 raw material meets the above requirement, selection may be reasonably made according to the costs of the raw material and the application scenario of the single-material mechanical functional member.

Further, regarding the construction of the unit cell library, selection of the lattice structure formed by the appropriate unit cell type, size, and periodic array mode includes reasonable combination of a self-designed unit cell or use of an existing unit cell.

A material library is required to include a variety of lattice unit cells, and lattice unit cell types are independently designed using CAD. The mechanical properties of the unit cell calculated in the finite element simulation (FEM) software include mechanical parameters such as Young's modulus, bulk modulus, and shear modulus. According to the calculation results, change curves and equations of mechanical parameters with conditions (truss size, unit cell diameter, etc.) are summarized and imported into mathematical calculation software such as MATLAB. Mathematical calculation software such as the MATLAB may be used to manually change the unit cell size and periodic array mode and calculate the change law of the changed mechanical parameters. The lattice unit cells that are designed by researchers are adopted, such as a simple cube (SC), face-centered cube (FCC), body-centered cube (BCC), regular octahedron, octet truss, and triply periodic minimal surface (TPMS), etc., and change formulas of the corresponding mechanical properties with the unit cell size and periodic array mode are stored in the mathematical calculation software such as the MATLAB.

According to the size and mechanical properties of the $1^{st}$ entity obtained by dividing the input multi-material functional member as well as the mechanical parameters of the selected single material, an appropriate unit cell type, size, and periodic array mode are designed, and there are $b_1$ (b=1, 2, 3, 4, ..., n) types of matched lattice structures formed by corresponding unit cell type, size, and periodic array mode. One of the lattice structures is selected to replace the $1^{st}$ entity obtained by dividing the multi-material mechanical functional member of multiple materials, and the remaining $b_1-1$ lattice structures are treated as candidates. In the same way, the above method is also applied to the $2^{nd}$, $3^{rd}$, $4^{th}$, ..., and $a^{th}$ entities obtained by dividing the multi-material mechanical functional member. Finally, a lattice structures are selected to replace the a entities obtained by dividing the multi-material mechanical functional member. The remaining $b_2-1$, $b_3-1$, $b_4-1$, ..., and $b_a-1$ lattice structures are treated as candidates.

Further, the mechanical properties of the selected a lattice structures are measured, including verification of whether the mechanical properties of the lattice structures meet the requirements.

Irregular lattice structures may be formed after lattice unit cell arrays. The mechanical properties calculated based on the lattice unit cells in MATLAB may deviate from actual applications, which needs to be further verified by finite element simulation (FEM). If the mechanical properties conform to the corresponding a multi-material entities, a three-dimensional spatial combination may be directly performed on the a lattice structures. If the mechanical properties do not meet the requirements, the step regarding the lattice unit cell library is repeated to select an alternate lattice structure until a single-material mechanical functional member with similar mechanical properties to the multi-material mechanical functional member is formed.

Further, the three-dimensional space combination is performed on the a lattice structures, including direct superposition combination and indirect superposition combination.

Figure 2:
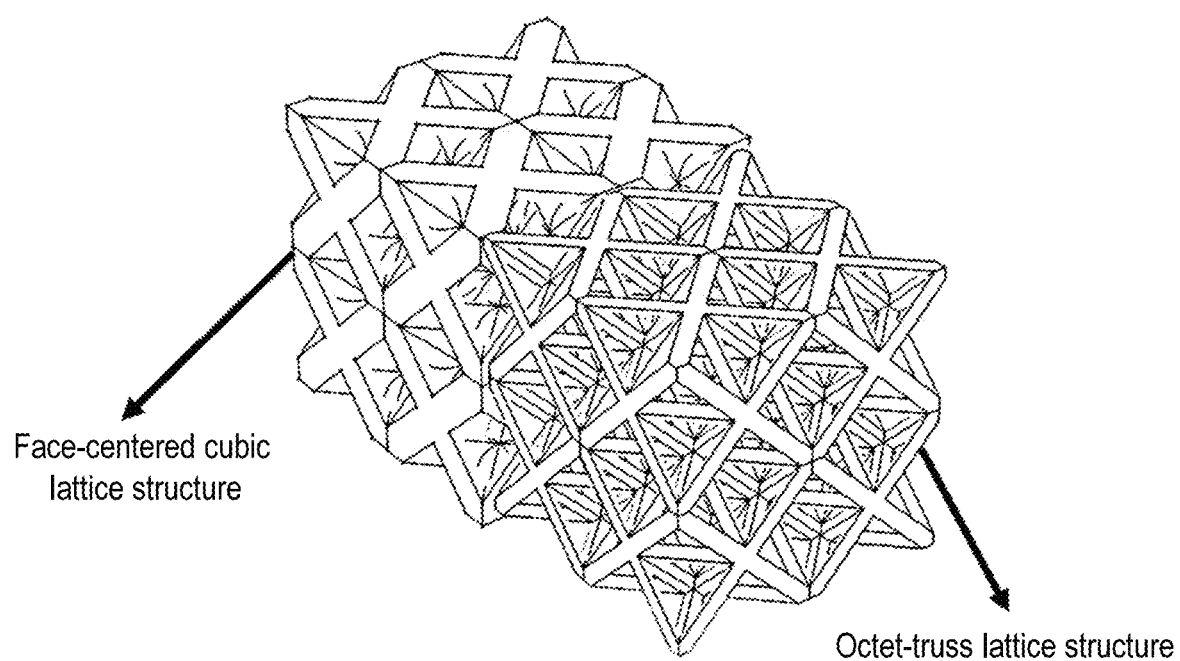
FIG. 2 is a schematic diagram of direct connection between side surfaces of a face-centered cubic lattice structure and an octet-truss lattice structure according to a preferred embodiment of the disclosure.
Figure 3A:
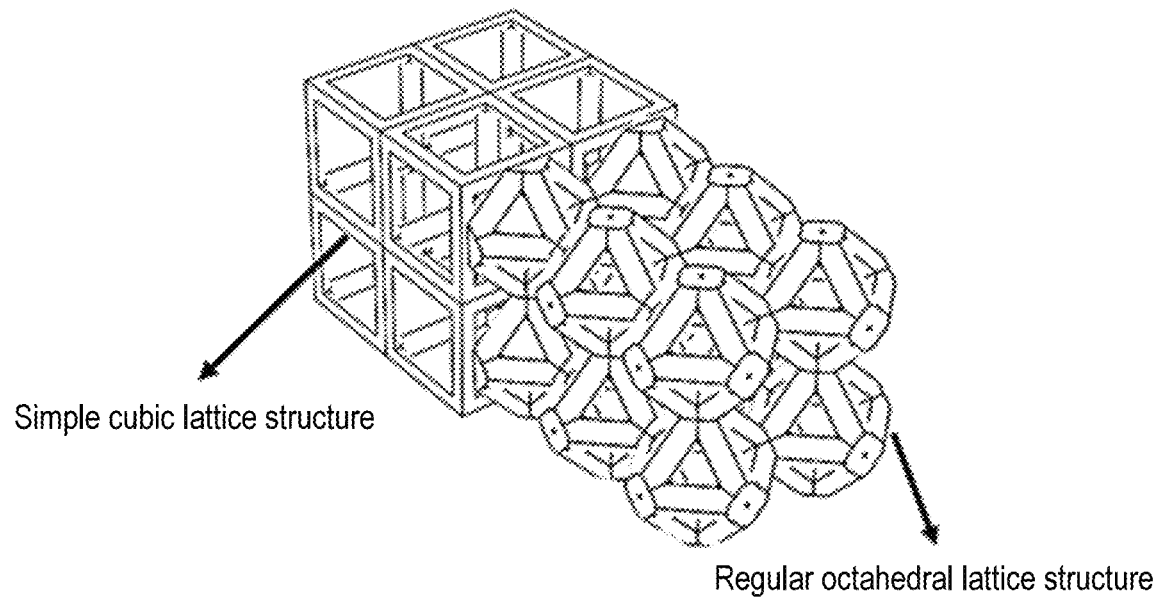
FIG. 3A and FIG. 3B are diagrams of direct connection between sides of a simple cubic lattice structure and a modified regular octahedral lattice structure according to a preferred embodiment of the disclosure, where
Figure 3B:
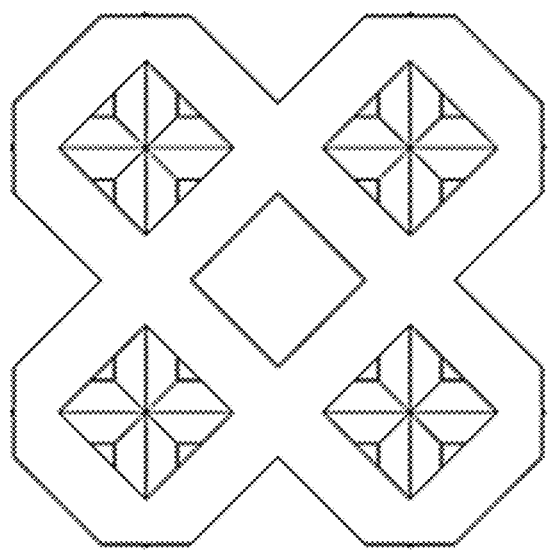

When two structures have similar unit cell sizes and side surfaces of the two structures may be directly connected, the side surfaces are directly superimposed in a longitudinal direction or in a vertical direction. As shown in FIG. 2, taking a face-centered cubic lattice structure (FCC) and an octal-truss lattice structure as an illustration as an example, a side frame of the FCC structure is directly combined with a side frame of the octet truss. When the two structures have similar unit cell sizes, but side surfaces of the two structures may not be directly connected, the side surfaces are directly superimposed in the longitudinal direction or in the vertical direction. The combination of a simple cubic lattice structure (SC) and a regular octahedral lattice structure shows that the two structures cannot be directly combined in a horizontal direction or in the vertical direction. It can be seen that the side surface of the FCC lattice structure is a square frame, there is no solid structure inside the frame, and a side solid portion of the regular octahedral lattice structure is located in the center of the square frame. Since there is no solid structure around the square frame, a combined structure may not be formed. As shown in FIG. 3A and FIG. 3B, by removing some regions of the regular octahedral lattice structure and changing the position of the side solid portion of the regular octahedral lattice structure, the modified position of the side solid portion of the regular octahedral lattice structure may be combined with the solid frame of the square side of the simple cubic (SC) lattice structure. The corresponding mechanical parameters of the modified combined lattice structure may fluctuate, so only approximate mechanical properties may be obtained by this method.

Figure 4:
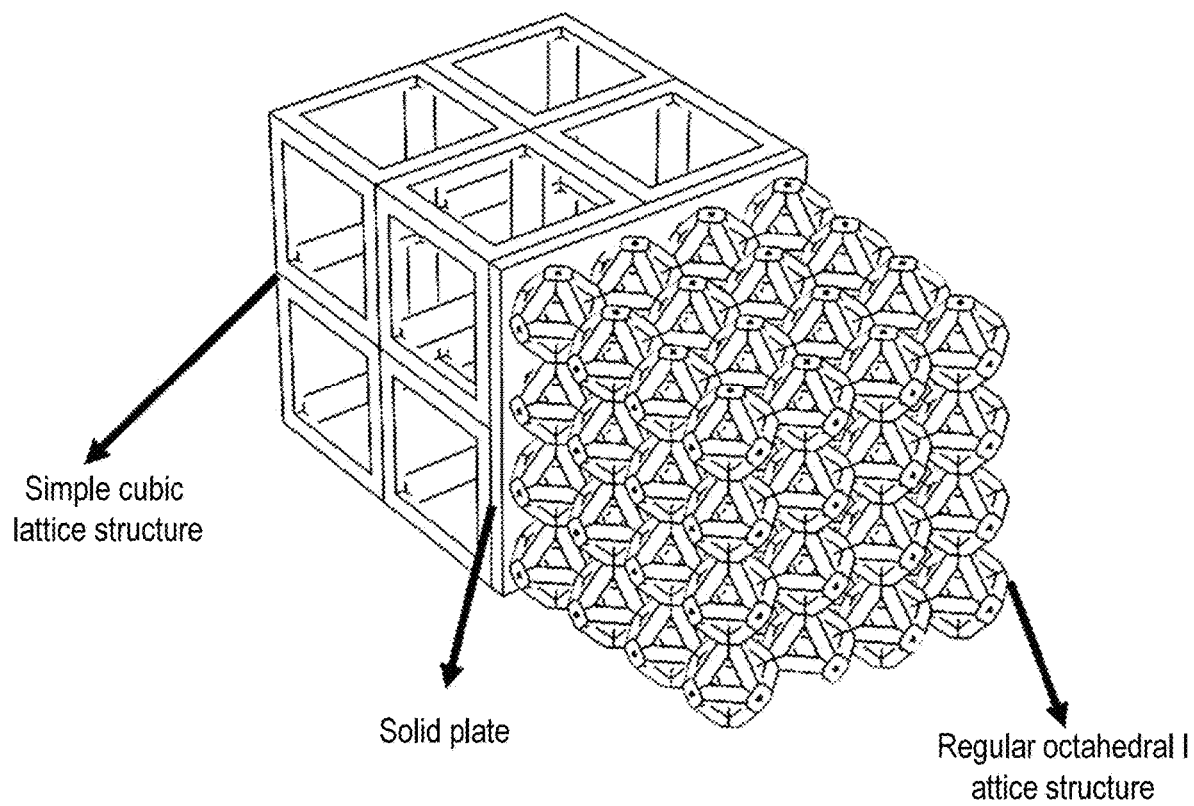
FIG. 4 is a schematic diagram of indirect connection between side surfaces of the simple cubic lattice structure and the regular octahedral lattice structure through a solid plate according to a preferred embodiment of the disclosure.

The side surfaces of the two structures are directly superimposed in the longitudinal direction or in the vertical direction. When the unit cell sizes of the two structures are considerably different, a stable combination may not be formed by direct superposition or by modifying the side surfaces of the lattice structures. The side surfaces may be connected through addition of a solid plate. Taking the connection of the simple cubic (SC) lattice structure with a larger unit cell size and a regular octahedral lattice structure with a smaller unit cell size as an example, as shown in FIG. 4, a solid plate is added at the connection for indirect connection, and a thickness of the solid plate is selected according to needs. Only approximate mechanical properties may be obtained through this method. The purpose of addition of the solid plate is to ensure a smooth transition of the mechanical properties of the connected portion of the two lattice structures and to reduce stress concentration.

In the above methods, the connection is performed directly or indirectly. The connection is rigid, and in some cases, there are obvious sharp corners, which is easy to cause stress concentration. The sharp corners of the connection may be removed or smooth transition processing may be performed as required, or a self-designed connection method may also be used.

Further, the manufacturing of a single-material mechanical functional member having a mixture of various lattice structures includes selection of a reasonable additive manufacturing method according to material types.

A single-material mechanical functional member based on a mixture of various lattice structures exhibits a complex shape. For a large member, such member may be manufactured by investment casting, molten gas injection, physical vapor deposition, sheet metal technology, and other processing methods. However, a multi-material mechanical functional member has a small size and complex shape. As such, it is difficult to obtain a good internal lattice unit cell through the above processing technologies, and there are obvious stress fluctuations when an external force is applied. Therefore, the additive manufacturing (AM) technology that can produce high precision and obtain a good surface is selected to replace the above traditional processing technology. Reasonable additive technology means are selected according to the material types. Selective laser melting (SLM) and laser sintering technology (SLM) are suitable for titanium alloys, stainless steels, aluminum alloys, and other metal materials. Fused deposition modeling (FDM) is suitable for engineering plastics such as PLA and nylon, and light curing molding (SLA) is suitable for photosensitive materials such as photosensitive resin.

Figure 5:
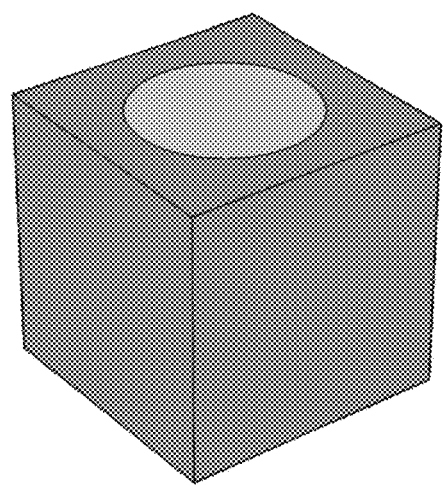
FIG. 5 is a schematic diagram of a multi-material mechanical functional member to be formed constructed according to a preferred embodiment of the disclosure.
Figure 6:
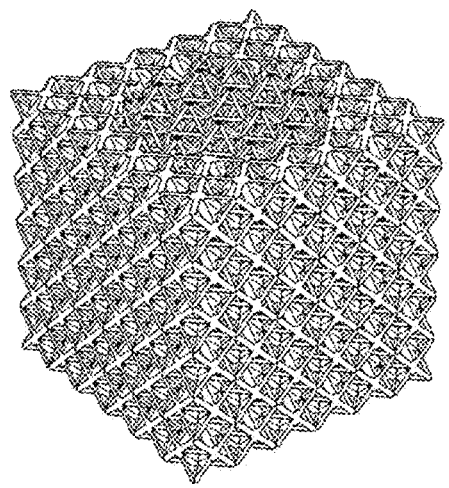
FIG. 6 is a schematic diagram of a single-material functional member prepared by the multi-material mechanical functional member shown in FIG. 5 according to the method of the disclosure according to a preferred embodiment of the disclosure.
Figure 7:
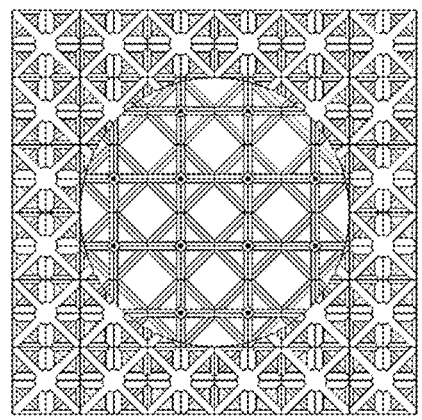
FIG. 7 is a top view of FIG. 6 constructed according to a preferred embodiment of the disclosure.

As shown in FIG. 5, a multi-material mechanical functional member is provided, which is formed by a cube periphery and a cylinder core portion of two different materials. As shown in FIG. 6, a single material mechanical functional member formed by two lattice structures consisting of a cube periphery and a cylindrical core portion is provided. As shown in FIG. 7, it is a top view after the combination of the two lattice structures. The appearance of the single-material mechanical functional member after the combination of the two lattice structures is similar to that of the multi-material mechanical functional member, and the required mechanical properties may be achieved by adjusting the material type and the unit cell type, size, and array mode later.

A person having ordinary skill in the art should be able to easily understand that the above description is only preferred embodiments of the disclosure and is not intended to limit the disclosure. Any modifications, equivalent replacements, and modifications made without departing from the spirit and principles of the disclosure should fall within the protection scope of the disclosure.

What is claimed is:

1. A method for forming a multi-material mechanical functional member in additive manufacturing, comprising:
    S1: dividing an object to be formed comprising a plurality of types of materials into a plurality of portions according to the different types of materials, analyzing and measuring mechanical properties of each portion, and constructing a database comprising a plurality of unit cell structures, that is, a unit cell library;
    S2: selecting one unit cell structure from the unit cell library for each portion of the object to be formed and forming a lattice structure by using the unit cell structure to obtain the lattice structure corresponding to each portion of the object to be formed;
    S3: selecting a raw material of the lattice structure, measuring and comparing mechanical properties of each lattice structure with the mechanical properties of each portion of the object to be formed in step S1, wherein when the mechanical properties of the lattice structure corresponding to each portion are not less than the mechanical properties of each portion of the object to be formed in step S1, the lattice structure is the required lattice structure, otherwise, step S2 is repeated;
    S4: assembling the lattice structures corresponding to the portions obtained in step S3 into a three-dimensional model of the object to be formed, wherein the three-dimensional model is formed by a method of additive manufacturing to accordingly obtain the required object to be formed.

2. The method for forming the multi-material mechanical functional member in additive manufacturing according to claim 1, wherein the raw material in step S3 of selecting the raw material of the lattice structure is a material, that is, the raw materials of the lattice structures corresponding to the portions are the same and all are the selected materials.

3. The method for forming the multi-material mechanical functional member in additive manufacturing according to claim 1, wherein a method of measuring the mechanical properties of each portion in step S1 is implemented through experimental measurement or finite element simulation.

4. The method for forming the multi-material mechanical functional member in additive manufacturing according to claim 1, wherein mechanical parameters of the unit cell structures in the unit cell library are known in step S1, and the mechanical parameters comprise Young's modulus, bulk modulus, and shear modulus.

5. The method for forming the multi-material mechanical functional member in additive manufacturing according to claim 1, wherein each unit cell structure in the unit cell library is preferably a simple cube, a face-centered cube, a body-centered cube, a regular octahedron, an octet truss, or a triply periodic minimal surface in step S1.

6. The method for forming the multi-material mechanical functional member in additive manufacturing according to claim 1, wherein the step of assembling the lattice structures into the three-dimensional model of the object to be formed in step S4 further comprises: setting connection structures at connection interfaces of different portions, such that the three-dimensional model obtained after assembly meets mechanical property requirements of the overall object to be formed.

7. The method for forming the multi-material mechanical functional member in additive manufacturing according to claim 1, wherein the method of additive manufacturing is selected according to the selected raw material in step S4, laser selective sintering or a laser sintering technology is selected for a metal material, fused deposition modeling is used for engineering plastics, and photocuring molding is selected for a photosensitive material.

* * * * *